(12) United States Patent
Palmgren

(10) Patent No.: US 6,858,050 B2
(45) Date of Patent: Feb. 22, 2005

(54) REDUCING METALS AS A BRAZING FLUX

(75) Inventor: Gary M. Palmgren, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/413,682

(22) Filed: Apr. 15, 2003

(65) Prior Publication Data

US 2003/0201308 A1 Oct. 30, 2003

Related U.S. Application Data

(62) Division of application No. 09/788,784, filed on Feb. 20, 2001, now Pat. No. 6,575,353.

(51) Int. Cl.[7] .............................. B24D 3/00; B32B 5/16; B32B 15/00; B23K 1/19

(52) U.S. Cl. ........................... 51/297; 51/309; 428/621; 428/632; 428/685; 428/539.5; 228/120; 228/122.1

(58) Field of Search ........................ 51/309, 295, 297; 228/120, 226, 122.1; 428/615, 621, 632, 685, 539.5

(56) References Cited

U.S. PATENT DOCUMENTS

| | | |
|---|---|---|
| 2,746,888 A | 5/1956 | Ross |
| 3,293,012 A | 12/1966 | Smiley et al. |
| 3,378,914 A | 4/1968 | Miller |
| 3,588,992 A | 6/1971 | Asaeda et al. |
| 3,650,714 A | 3/1972 | Farkas |
| 4,365,995 A | 12/1982 | Mori |

(List continued on next page.)

FOREIGN PATENT DOCUMENTS

| | | |
|---|---|---|
| EP | 0 467 404 A1 | 1/1992 |
| EP | 0 374 475 B1 | 6/1993 |
| EP | 0 743 131 A1 | 11/1996 |
| GB | 516 474 | 1/1940 |
| GB | 2 275 690 A | 9/1994 |
| JP | 57-068287 | 4/1982 |
| WO | WO 90/05170 | 5/1990 |
| WO | WO 91/07242 | 5/1991 |
| WO | WO 92/12821 | 8/1992 |
| WO | WO 92/22398 | 12/1992 |
| WO | WO 95/00286 | 1/1995 |
| WO | WO 96/02332 | 2/1996 |

(List continued on next page.)

OTHER PUBLICATIONS

Filler Metals, Lucas–Milhaupt, Inc., Cudahy, WI.
Gaskell, "Reactions Involving Pure Condensed Phases and A Gaseous Phase", *Introduction to the Thermodynamics of Materials*, Third Edition, pp. 361–363.

(List continued on next page.)

*Primary Examiner*—Deborah Jones
*Assistant Examiner*—Jason L Savage
(74) *Attorney, Agent, or Firm*—Colene H. Blank

(57) ABSTRACT

The present invention comprises a method of manufacturing a brazed body. The method comprises forming a multi-layer assembly comprising: a first material capable of forming a first oxide and having a melting temperature higher than 660° C.; a first reducing metal adjacent the first material, the reducing metal capable of reducing at least a portion of the first oxide on the first material a braze adjacent to the reducing metal; and a second material adjacent the braze, the second material comprising a material having a melting temperature higher than 660° C. The method then comprises creating a vacuum around the assembly, and heating the assembly to melt the reducing metal and the braze. The assembly is then subject to cooling to thereby form the brazed body.

4 Claims, 3 Drawing Sheets

U.S. PATENT DOCUMENTS

| | | | |
|---|---|---|---|
| 4,457,113 A | | 7/1984 | Miller |
| 4,519,537 A | | 5/1985 | Heinrich et al. |
| 4,610,934 A | | 9/1986 | Boecker et al. |
| 4,738,689 A | | 4/1988 | Gigl et al. |
| 4,763,828 A | | 8/1988 | Fukaya et al. |
| 4,874,398 A | | 10/1989 | Ringwood |
| 4,925,457 A | | 5/1990 | DeKok et al. |
| 4,929,511 A | | 5/1990 | Bye, Jr. et al. |
| 4,948,388 A | | 8/1990 | Ringwood |
| 5,024,860 A | | 6/1991 | Chang |
| 5,232,469 A | | 8/1993 | McEachron et al. |
| 5,250,086 A | | 10/1993 | McEachron et al. |
| 5,306,318 A | | 4/1994 | Carius et al. |
| 5,346,719 A | | 9/1994 | Zarnoch et al. |
| 5,359,770 A | * | 11/1994 | Brown et al. ............... 29/889.1 |
| 5,380,390 A | | 1/1995 | Tselesin |
| 5,470,014 A | | 11/1995 | Pritchard et al. |
| 5,620,489 A | | 4/1997 | Tselesin |
| 5,697,994 A | | 12/1997 | Packer et al. |
| 5,725,421 A | | 3/1998 | Goers et al. |
| 5,794,838 A | | 8/1998 | Ushikoshi et al. |
| 5,853,873 A | | 12/1998 | Kukino et al. |
| 5,861,605 A | | 1/1999 | Ogawa et al. |
| 5,914,061 A | | 6/1999 | Ogawa et al. |
| 6,076,727 A | | 6/2000 | Evans et al. |
| 6,110,031 A | | 8/2000 | Preston et al. |
| 6,123,612 A | | 9/2000 | Goers |
| 6,358,133 B1 | * | 3/2002 | Cesena et al. ............... 451/450 |
| 6,416,560 B1 | * | 7/2002 | Palmgren ..................... 51/309 |

FOREIGN PATENT DOCUMENTS

| | | |
|---|---|---|
| WO | WO 97/15696 | 5/1997 |
| WO | WO 98/10110 | 3/1998 |
| WO | WO 98/45091 | 10/1998 |
| WO | WO 00/00318 | 1/2000 |
| WO | WO 00/62969 | 10/2000 |

OTHER PUBLICATIONS

Gaskell, *Introduction to Mettallurgical Thermodynamics*, Second Edition, 1981, p. 287, no month.

Product Sheet, "MBS*–960 Diamond Titanium and Chromium Coated Products", GE Superabrasives, 1995, no month.

Alcock, "Gibbs Energy of Formation of Metal Oxides", *CRC Handbook of Chemistry and Physics*, 76th Edition, 1995–1996, pp. 5–72–5–75.

Brochure, "The MBS* 900 Series Product Line", GE Superabrasives, 1996, no month.

"Solders and Brazing Filler Metals", *Encyclopedia of Chemical Technology*, vol. 22, Fourth Edition, 1997, pp. 483–497, no month.

Carius, "Super Coatings for Superabrasives", *Cutting Tool Enigeering*, Jun. 1997, pp. 40–46.

Stratton, "Atmosphere brazing of stainless auto parts", *Advanced Materials & Processes*, Aug. 2000, pp. H14–H16.

* cited by examiner

REDUCING METALS AS A BRAZING FLUX

CROSS REFERENCE TO RELATED APPLICATION

The present application is a divisional of U.S. patent application Ser. No. 09/788,784, filed Feb. 20, 2001, now U.S. Pat. No. 6,575,353, which is incorporated by reference in its entirety herein.

FIELD OF THE INVENTION

This invention relates to methods of manufacture of brazed bodies, and abrasive articles made thereby.

BACKGROUND

Brazing is a process of joining or uniting an assembly of two or more materials into one structure. Brazing is achieved by heating the materials to a temperature below the solidus temperature of both the materials in the presence of a braze and an optional flux. A brazed body is a metal to metal bond joined by braze. In some instances, the flux is added to reduce the surface of one or both of the metals prior to the braze, creating a surface more agreeable to wetting and therefore achieving a better bond.

Some known fluxes, such as those containing non-metallic ionic salts such as borides and fluorides, work by dissolving oxides at low temperatures. For example, a fluoride flux commercially available under the trade name HANDY FLUX (commercially available from Lucas Milhaupt, Inc., Cudahy, Wis.), contains fluorides that begin to dissolve oxides at 315° C. and remain active from 590° C. to 870° C. These fluxes can cause undesirable results in some circumstances, because this type of flux can leave residual flux and reaction products of the flux within the brazed body that eventually contribute to corrosion spots in the brazed body. Additionally, these fluxes may deplete the surface of a metal of non-corrodible materials, leaving only corrodible materials in its place, for example leaving an iron-rich surface on stainless steel. Minimizing the amount of this type of flux assists in reducing the amount of corrosion that may eventually appear in a brazed body.

A preferred environment for brazing is a vacuum furnace because it minimizes the oxygen in the atmosphere available to attack the hot metals. Fluxes containing borides and fluorides are too volatile to be used in a vacuum furnace, and even a vacuum furnace is unable to stop all metals from oxidizing on their surface. An example of such a metal is stainless steel. An oxide of chromium on the surface of stainless steel inhibits the wetting of stainless steel parts, even in a vacuum furnace. One known solution is to plate a thin layer of nickel over the stainless steel. The braze will wet the nickel surface and metal diffusion will increase the bond between the plated nickel and the base of stainless steel. While plating the stainless steel with nickel works, it requires an expensive plating step and introduces quality assurance problems in making sure the plated nickel meets the requirements for brazing such as uniform coverage and adhesion.

Another known solution is mixing hydrogen into the vacuum furnace to react with any oxygen in the furnace, thereby delivering an oxygen-free environment as described in *Brazing of Stainless Steel*, Paul F. Stratton, *Heat Treating Progress*, p.p. H14–H16 (August 2000). However, in actual practice, an oxygen free environment is nearly impossible to achieve. This is especially true for certain metals (e.g. chromium) that oxidize so readily that they would require an extremely dry hydrogen atmosphere.

Therefore, it is desired to have a brazing flux that is non-volatile in the vacuum furnace and still reduces the surface of metals, especially easily oxidized metals. Additionally, it is desirable to have a simple and inexpensive method of brazing metals that are difficult to join.

SUMMARY OF THE INVENTION

In one embodiment of the invention, the invention comprises a method of manufacturing a brazed body. The method comprises forming a multi-layer assembly comprising: a first material capable of forming a first oxide and having a melting temperature higher than 660° C.; a first reducing metal adjacent the first material, the reducing metal capable of reducing at least a portion of the first oxide on the first material a braze adjacent to the reducing metal; and a second material adjacent the braze, the second material comprising a material having a melting temperature higher than 660° C. The method then comprises creating a vacuum around the assembly, and heating the assembly to melt the reducing metal and the braze. The assembly is then subject to cooling to thereby form the brazed body.

Another aspect of the invention provides a brazed body comprising a first layer comprising a first material, the first material having a melting temperature higher than 660° C.; a second layer comprising a second material, the second material having a melting temperature higher than 660° C.; and a filler layer between the first layer and the second layer, the filler layer comprising a multi-phase alloy having a braze and aluminum oxide.

The invention may also provide an abrasive article comprising a first layer comprising a fused abrasive body; a second layer comprising a material having a melting temperature higher than 660° C.; and a filler layer between the first layer and the second layer, the filler layer comprising a multi-phase alloy comprised of a braze and a reducing metal oxide. Another embodiment of the invention comprises an abrasive article comprising a plurality of abrasive particles; a metal having a melting temperature greater than 660° C.; and a filler layer between the metal and the abrasive particles comprising braze and aluminum oxide. Additionally, the invention provides for a multi-layer brazing assembly comprising a braze metal foil; and an aluminum coating covering at least part of one surface of the braze, the aluminum coating being at least 8 micrometers thick.

As used herein, the following terms have the following definitions:

"Flux" refers to a material that removes oxides from a surface of a base metal and promotes the wetting of the base metal.

"Native oxide" refers to a metal oxide formed from a metal without any additional oxide coatings.

"Reducing Metal" refers to a metal that forms an oxide having a free energy of formation that is less than the free energy of formation of the oxide of another metal it is being introduced to reduce.

DETAILED DESCRIPTION OF THE INVENTION

Method of Making

Figure 1:
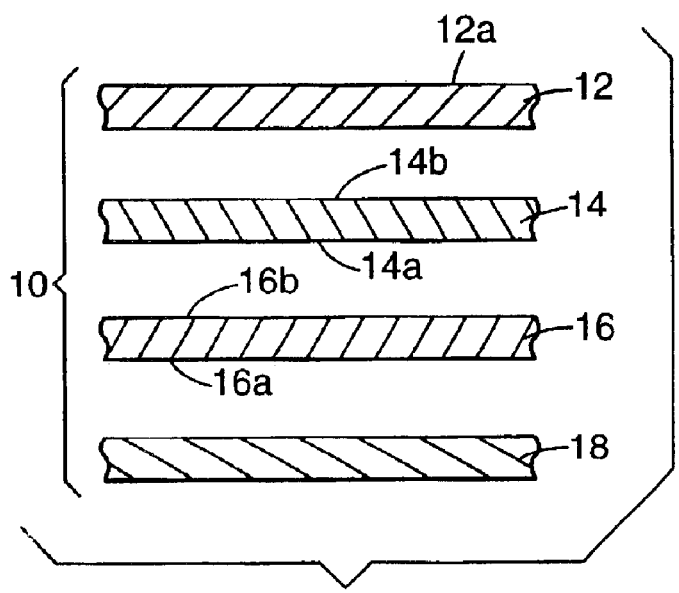
FIG. 1 is a cross sectional exploded view of an assembly according to an embodiment of the present invention.
Figure 2:
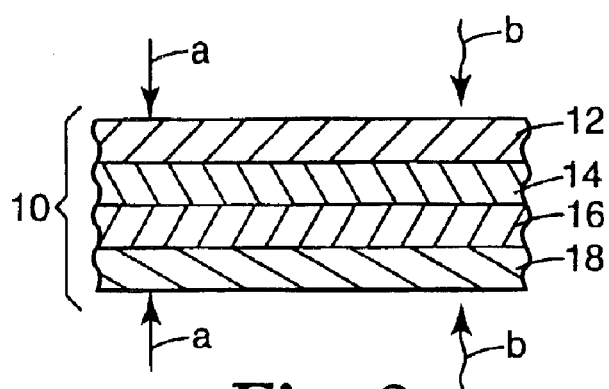
FIG. 2 is a cross section view of an assembly as in FIG. 1, the assembly being subjected to a pressure and heat treatment according to a method of the present invention.

An embodiment of the method of manufacturing the brazed body of the present invention is illustrated in FIGS. 1 and 2. Certain embodiments of the brazed body of the present invention are made by first forming an assembly 10. The assembly 10 comprises a first material 18 in contact with a reducing metal 16 on a surface 16a of the reducing metal 16. A braze 14 has a first surface 14a, placed in contact with an opposing surface 16b of the reducing metal 16. The braze's second surface 14b is then placed in contact with a second material 12.

In certain embodiments, the first material 18 is a metal. The first material 18 may have a surface pre-treated to remove any contaminants (e.g. oils) and any mill scale (the thick oxide layer created in high temperature processes) by any mechanical or chemical means known to those skilled in the art. In some embodiments, the first material 18 has a melting or solidus temperature above 660° C., for example about 850° C. to about 1600° C. In some embodiments, the melting or solidus temperature is above 1000° C. The present invention works for any thickness material. The thickness of the first material 18 may be more than 0.3 centimeter, for example between about 0.3 centimeter and about 1.0 centimeter.

In some embodiments, the first material 18 is, for example, capable of forming an oxide. For example, stainless steel readily forms an oxide on its surface, as do other materials such as titanium, zirconium, aluminum, chromium, nickel, iron, cobalt, and alloys containing these (e.g. those alloys sold under the tradename INCONEL, commercially available from Inco Alloys International; Huntington, N.Y.). In stainless steel, the oxide is formed in large part by chromium at a surface of the stainless steel reacting with oxygen in the atmosphere, and thereby forming a chromium oxide rich layer. The chromium oxide rich layer makes it difficult to wet the surface with a braze, inhibiting the ability to bond the surface to another material by brazing.

The second material 12 may be a layer (as depicted) or may be a bulk object or a plurality of bulk objects (not shown, e.g. abrasive particles). In certain embodiments, the second material 12 is a non-metal. In other embodiments, both materials 12 and 18 are metals. In such embodiments, the materials 12 and 18 may be the same or different metals. Metal materials include, for example, stainless steel, nickel, iron, chromium, cobalt, copper, and alloys containing these. Non-metal materials include, for example, ceramics, cubic boron nitride, aluminum nitride, or diamond. The second material 12 may also be a mixture of metal and non-metal materials. The thickness of the second material 12 may be about 250 micrometers. However, other thicknesses of the material may also be suitable for the present invention. The materials 12 and 18 may be the same thickness or they may each have a different thickness. Additionally, the materials 12 and 18 may be of complex shapes (not shown), such that the shapes may complement each other or the materials 12 and 18 may be of shapes that do not complement each other (i.e. the materials would lie together with gaps between them). The second material 12 has an opposing surface 12a, which may be sintered, brazed, or otherwise bonded to additional structures (not shown).

In certain embodiments, the second material 12 may also be capable of forming an oxide. In those instances, the braze's opposing side 14b may be placed in contact with a second reducing metal (not shown), and the second material 12 would be placed in contact with the second reducing metal. The second reducing metal may be the same as the original reducing metal 16 or different, so long as it reduces the second material 12. In some embodiments, the second material 12 has a melting or solidus temperature above 660° C., for example about 850° C. to about 1600° C. In some embodiments, the melting or solidus temperature is above 1000° C.

The entire assembly 10 may be optionally held in place under pressure as depicted by the vertical arrows "a" shown in FIG. 2. The pressure may be applied by hydraulic or pneumatic cylinders, weights, or a clamp, for example a C-clamp, a spring clamp, or by any other mechanical or non-adhesive bond means known to those skilled in the art. Pressure may cause some of the braze 14 and the reducing metal 16 to be pushed out the side of the assembly and be removed from the finished article.

A vacuum is then created around the assembly, while the assembly is held in place under pressure. The air pressure is lowered to at least about 0.6 Pa to create the vacuum. In some embodiments, the vacuum is at least 0.1 Pa, for example 0.05 Pa.

The assembly 10, while under vacuum and held together with pressure, is then heated as depicted by the vertical arrows "b" shown in FIG. 2. In some embodiments, the temperature is raised to between about 80 and about 120° C. to remove any absorbed water from the assembly. The brazing temperature depends on the liquidus of the chosen braze. Generally, the brazing temperature is between about 10 and about 80° C. above the liquidus temperature of the braze. In some instances, the assembly 10 is heated to between about 250 and about 400° C. for about 1 to about 10 minutes in order to burn off any residual organic material from the assembly. Then the temperature is raised to between about 700 and about 900° C. for between about 1 and about 15 minutes in order to melt the braze and the reducing metal.

The assembly is then cooled. The cooling may take place by any means known to the art. For example, the cooling may be accomplished by introducing cool gases into the vacuum chamber, or the assembly may remain in the vacuum after the heat is stopped, gradually returning to room temperature. The assembly may also be cold quenched. The cooling may additionally be accomplished by allowing the assembly to cool at room temperature and atmospheric pressure until cool.

Braze

Any suitable braze may be used for the brazed body of this invention. A braze is a metal or an alloy that typically has a melting point above 450° C., but not higher than, and typically less than the melting points of the materials to be joined. The braze is generally chosen based on its relationship to the materials to be joined. The braze is chosen to meet the strength and corrosion requirements of the intended application. Additionally, the ability of a certain braze to bind to certain metals is well known, and therefore the braze should be chosen based on the identity of the materials 12 and 18 to be joined. For example, brazes are listed in the *Kirk-Othmer Encyclopedia of Chemical Technology*, Vol. 22, pp 489–490 (4th ed., 1997). Additionally, the cost of certain alloys, such as those containing silver or indium, may be a factor for a given application. A braze should be capable of wetting the surfaces of the materials to be joined. Examples of brazes include, but are not limited to nickel, nickel alloy, silver, silver alloy, gold, gold alloy, copper, copper alloy, iron, iron alloy, cobalt, cobalt alloy, tin, tin alloy, boron, silicon, chromium, chromium alloy, indium and mixtures thereof.

In some embodiments, the braze melts at a temperature near 700° C., for example, a braze containing copper, silver, tin, indium or combinations thereof. In certain embodiments, the braze may be in the form of a solid foil or a porous foil. In those instances, the braze foil is generally between about 25 and about 760 micrometers thick.

Reducing Metal

The brazed body of the present invention additionally includes a reducing metal. Such a reducing metal, when placed on the metal surface, functions to react with the oxygen present as an oxide on the surface of a metal. The reduction takes place by way of an oxidation reaction between the oxygen present in the oxide on the surface and the reducing metal because the oxygen present in the oxide on the metal surface prefers to form an oxide with the reducing metal. The oxidation reaction results in a portion of the reducing metal being converted to an oxide, and has the effect of reducing the oxide on the surface, allowing the surface to be favorable to wetting and joining.

By reacting with the oxygen on the surface of the metal, the reducing metal creates an oxide-free surface on the metal to bond to. At least a portion of the oxygen on the surface of the metal will prefer to oxidize the reducing metal, thereby leaving the metal surface substantially free of its native oxide.

Selection of a proper reducing metal for a given system is aided by the use of an Ellingham Diagram. An Ellingham Diagram is used to predict the partial pressure of oxygen ("$P_{O2}$") that exists in equilibrium with a given metal at a given temperature. An Ellingham Diagram can be found as FIG. 4 herein. An example of an Ellingham Diagram may also be found in FIG. 10.13 of David R. Gaskell, *Introduction to the Thermodynamics of Materials*, 3rd edition, McGraw-Hill Book, Co., page 370.

Figure 4:
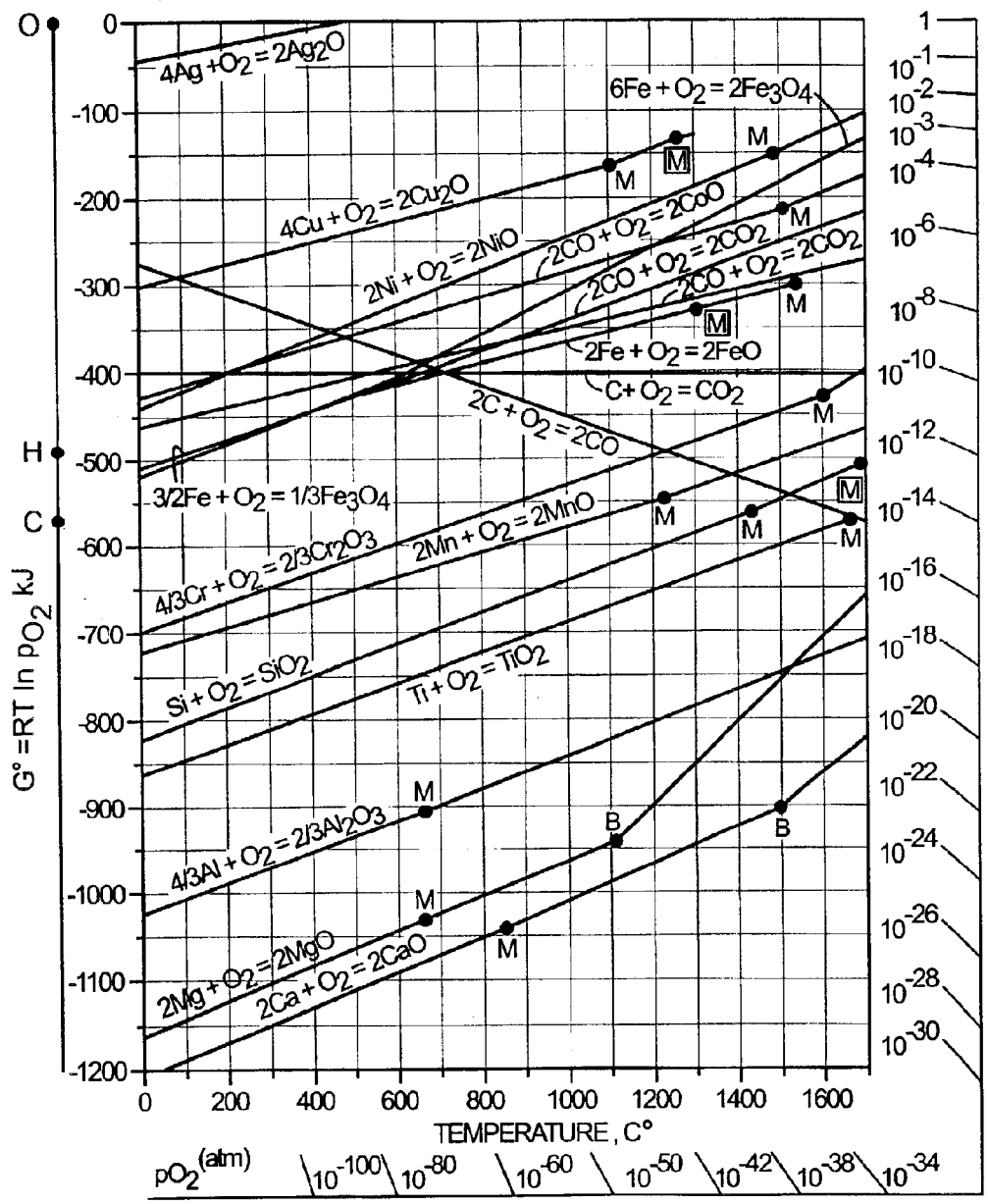
FIG. 4 is an Ellingham diagram.

Referring to FIG. 4 showing an Ellingham Diagram, the x-axis represents temperature (° C.) and the y-axis represents the free energy of formation of the oxide ($\Delta G_{oxid}$ (Joules/mole)). To employ the Ellingham diagram for a particular metal oxidation reaction of interest, one locates the point of intersection of the vertical line corresponding to the temperature of interest and the Ellingham line for the metal oxidation. Next, one draws a line connecting this point of intersection to the point labeled "O" in the upper left hand corner of the diagram. That line is then extended until it intersects the $P_{O2}$ scale on the bottom or right sides of the diagram. This point of intersection on the $P_{O2}$ scale is equal to the $P_{O2}$ (atm) in equilibrium with the metal of interest at the temperature of interest.

Using the procedure outlined above, a suitable reducing metal for a certain metal provides an equilibrium $P_{O2}$ at the brazing temperature that is less than the equilibrium $P_{O2}$ at the brazing temperature of the metal that is becoming part of the bond. For example, at a brazing temperature of about 800° C., aluminum has a $P_{O2}$ of about $10^{-42}$ atmospheres, while chromium has a $P_{O2}$ of about $10^{-30}$ atmospheres. Therefore, aluminum is a suitable reducing metal for chromium.

Another way to predict if a metal is a suitable reducing metal for a given metal is to determine if the Gibbs free energy of oxidation ($\Delta G_{oxid}$) at the brazing conditions for the reducing metal is less than the $\Delta G_{oxid}$ of the metal being joined. The $\Delta G_{oxid}$ for a metal oxidation reaction at a given temperature can also be determined from the Ellingham Diagram. First, locate the point of intersection of the vertical line corresponding to the temperature of interest and the Ellingham line for the metal oxidation reaction of interest. Next, draw a horizontal line, parallel to the x-axis, from the point of intersection to the y-axis. The point where the horizontal line meets the y-axis is equal to the $\Delta G_{oxid}$ of the metal oxidation reaction at the given temperature. If the $\Delta G_{oxid}$ of the potential reducing metal is less than the $\Delta G_{oxid}$ for the metal to be joined, then the reducing metal may be used for that metal.

In certain embodiments, the reducing metal is aluminum. For example, embodiments joining stainless steel to another material or joining stainless steel to stainless steel may use aluminum as a reducing metal. The aluminum is a reducing metal with respect to an oxide of chromium on the surface of stainless steel, converting it to metallic chromium so that the brazing metals can wet and bond to the stainless steel. The aluminum is typically in the form of a thin foil placed between the stainless steel and the braze filler metal. The aluminum foil should be much thinner than the braze to minimize the change in the braze filler metal composition, but thick enough so that enough aluminum is present to react with the oxide of chromium.

Additionally, aluminum is often added to metal alloys to increase corrosion resistance. A small amount of aluminum can form a passivating layer on the surface of metals to reduce corrosion. In addition, aluminum oxide is not as cosmetically objectionable as are other oxides. Corrosion resistance tends to maintain the strength of the brazed body. Other elements can potentially be used that have a greater affinity for oxygen than chromium. These would include titanium, silicon, and magnesium.

The selection of materials other than aluminum to reduce the oxide of chromium would depend upon the melting point of the braze and the reducing metal. In order to actively reduce the oxides on the surface of the stainless steel, it is best if the reducing metal melts at a temperature slightly below the melting point of the braze filler metal. If the reducing metal melts at a temperature much lower than the braze, there may be too long a time period before the braze filler metal melts and it may react with the atmosphere to form undesirable materials that will weaken the joint.

The reducing metal 16 is generally a separate layer from the braze 14 prior to the brazing procedure. The reducing metal layer 16 may be, for example, in the form of a separate foil layer. In these embodiments, the foil layer is generally between about 0.3 and about 200 micrometers thick. The foil layer may be a solid layer, or may comprises openings (e.g. a mesh or porous foil). In some embodiments, the foil layer may be between about 5 and about 120 micrometers thick, for example between about 5 and about 20 micrometers thick. The reducing metal layer 16 may alternatively be in the form of a powder, which can be dusted on the first material 18. In these embodiments, a layer of reducing metal is dusted onto the first material to form a layer that is typically between about 5 and about 20 micrometers thick. The reducing metal layer 16 may also be in the form of a film coating on the braze 14, deposited, for example by sputtering, electroplating, electroless plating, dip coating or vapor deposition. In these embodiments, the deposited coating thickness on the braze may be between about 0.5 and about 5 micrometers.

An additional benefit may exist if intermetalics are formed between the braze and the reducing metal, releasing heat. For example, in a system having a copper braze and an aluminum reducing metal, the formation of AlCu releases about 40 kilojoules per mole, helping to melt the braze. Without wishing to be bound by any theory, it is believed that this thermodynamic driving force also insures good mixing of the reducing metal and the braze to make a strong, uniform joint. In this manner, a construction with only a thin layer of relatively pure reducing metal interposed between the metal and the braze on one side of the joint is avoided.

Brazed Body

Figure 3:
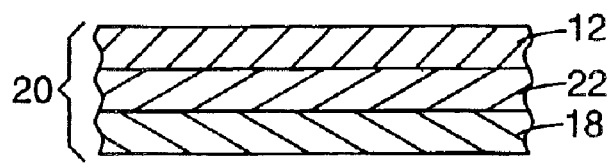
FIG. 3 is a cross sectional view of a brazed body according to an embodiment of the present invention.

The brazed body of the present invention, as illustrated in FIG. 3, includes at least two materials 12 and 18, joined together with a filler material 22. This brazed body may have a thickness of between about 0.6 and about 1 centimeter, such as, for example, about 0.635 centimeters. In certain embodiments, the filler layer 22 is a multi-phase alloy of the oxide of the reducing metal and the braze. In some instances, the reducing metal is also present in the filler layer. In some embodiments, the reducing metal oxide is present throughout the entire thickness of the filler layer. In other embodiments, the reducing metal oxide exists in discrete islands throughout the filler layer. The reducing metal oxide may also exist as discrete islands along the surface of the first material toward the bond. The filler layer may be about 100 micrometers thick. However, those skilled in the art will appreciate that other thicknesses of the filler layer may be appropriate as well, and the present invention is not limited to any thickness described herein.

The brazed body may be stable at all temperatures below, for example, 450° C. For example, if the filler material comprised a solder, the brazed body would fail at the melting temperature of the solder, which by definition would be below 450° C.

Abrasive Articles

The brazed body of the present invention may be used to form abrasive articles. In some instances, the brazed body is present in sintered abrasive articles. For example, a fused abrasive body may serve as the second material 12 if brazed to another supporting material serving as the first material 18.

In one embodiment of a fused abrasive body of the present invention, abrasive particles are randomly distributed throughout a metal matrix. To prepare such a fused abrasive body, a fusible composition is first prepared by combining a metal powder, a plurality of metal coated abrasive particles, and any desired optional ingredients (e.g., organic binders, hard particles (e.g., tungsten carbide particles)). Metal matrix materials comprise, for example, metal powders comprising bronze, cobalt, tungsten, copper, iron, nickel, tin, chromium, or mixtures or alloys containing these. Organic binders include polymers, such as, for example, polyvinyl butyral, and are included in the fusible composition to allow consolidation of the metal powders into a shaped mass, known as a green body, that can be physically handled. Generally, the organic binder is included in the fusible composition in the minimum amount necessary to provide the desired properties due to the fact that the organic binder must burn off during the fusing process. Optionally, hard particles such as tungsten carbide may be added to fusible composition to increase the wear resistance of the resulting fused abrasive body. Typically, hard particles are added in an amount ranging from about 10–50% by weight of the fusible composition although amounts outside of this range may be advantageous in some compositions. Organic solvents may be added to the fusible composition in an amount necessary to solvate the organic binder. Typical organic solvents include, for example, methyl ethyl ketone and are added to the fusible composition in an amount minimally necessary to solvate the binder.

Once the fusible composition is prepared, it is then cold compacted in a mold using a press to form a green body compact. The green body compact is then fused. Fusing may be accomplished by, for example, sintering. Sintering temperatures typically range from about 700–1100° C. and typical sintering times range from about 5–30 minutes. Pressure may be also applied during the sintering process. Typical sintering pressures range, for example, from about 100–500 kg/cm$^2$. After fusing, the resulting fused abrasive body may be cut to the desired size and shape.

In another embodiment of a fused abrasive body of the present invention the abrasive particles are non-randomly distributed throughout the metal matrix. For example, the abrasive particles may be concentrated in one or more substantially planar layers within the metal matrix. Such a sintered abrasive body may be formed, for example, by the techniques reported in U.S. Pat. No. 5,380,390 (Tselesin), incorporated herein by reference.

Fused abrasive bodies of the present invention may be utilized in cutting and grinding wheels. Such a wheel is substantially cylindrical in shape and includes a fused abrasive body, typically sandwiched between a first support plate and a second support plate, which may be brazed to the fused abrasive body using the present invention. The wheel includes a bore through its center, which allows the wheel to be mounted to a rotatable shaft for rotation.

In another embodiment, a fused abrasive body comprising a single layer of abrasive bonded to a metal shim may be attached to a disk or a ring to form the face of a face grinding tool. The disk or ring is rotated in the plane of the disk or ring and the workpiece is abraded with the essentially planar side of the disk. The fused body may consist of a nickel shim with abrasive bonded on one side with a corrosion resistant alloy. Such a fused abrasive body may be formed for example by the techniques reported in U.S. Pat. No. 6,123,612 (Goers), which is herein incorporated by reference. The fused abrasive body having one side consisting of nickel may be brazed by the present invention to a stainless steel support plate. The brazed assembly may be cut into the form of a disk to form the abrasive tool. Alternatively, the brazed assembly may be cut into segments that are further attached to a ring to form an abrasive tool. The brazed segments may be attached to the ring, for example, by screws or an adhesive.

EXAMPLES

The following non-limiting examples further illustrate the invention. All parts, percentages, ratios, etc. in the examples are by weight unless otherwise indicated.

Terms and Abbreviations

| Abbreviation | Definition |
| --- | --- |
| BR505 | 50 weight percent silver, 20 weight percent Copper, 28 weight percent Zinc, and 2.0 weight percent Nickel braze. Commercially available from Lucas-Milhaupt, Inc., Cudahy, WI. |
| BR604 | 60 weight percent silver, 30 weight percent Copper, and 10 weight percent tin braze. Commercially available from Lucas-Milhaupt, Inc., Cudahy, WI. |
| BR616 | 61.5 weight percent silver, 24 weight percent copper, and 14.5 weight percent tin braze. Commercially available from Lucas-Milhaupt, Inc., Cudahy, WI. |

Materials

Examples were prepared by joining 430 stainless steel plates 5 millimeters thick and nickel shim 0.25 millimeters thick. Surface ground stainless steel plates were purchased from Precision Process Corp., Elk Grove, Ill. Nickel shim was purchased from Criterion Metals Inc., St. Charles, Ill. and used in "as rolled" condition. Examples of each metal were cut to 50 millimeters wide by 150 millimeters long. Before brazing the examples were cleaned with a solution of Alconox Powdered Precision Cleaner available from Alconox Inc., New York, N.Y. in de-ionized water with the assistance of an ultrasonic bath. The examples were then rinsed with de-ionized water and air-dried.

Brazing Procedure

A brazing assembly was formed by stacking the components in the following order: a) stainless steel plate; b) reducing metal(s); c) BR604 braze foil; d) nickel shim. Four stacked brazing assemblies were separated by 0.005 inch (0.0127 cm) sheets of graphite paper, (commercially available from UCAR Carbon Co., Clarksburg, W.Va.) and clamped between two 0.5×4×6 inch (1.27×10.16×15.24 cm) steel plates joined near their corners by four 0.25 inch (0.635 cm) stainless steel threaded rods. Nuts on the threaded rods were evenly tightened to about 50 ft-lb. (68 N-m) at which time the rods began to yield.

The clamped assembly of four examples was placed in the center of the working volume of a vacuum furnace. The vacuum furnace had a working volume of 30 centimeter diameter by about 25 centimeters high. It was electrically heated by graphite cloth electrodes. The furnace was lined with graphite felt insulation. The graphite, when heated to temperature, removed any trace free oxygen by forming carbon monoxide. The base vacuum for the furnace prior to heating was about $2 \times 10^{-5}$ Torr (0.0026 Pa). The vacuum was produced with an oil diffusion pump and a mechanical roughing pump. However, when operated at brazing temperatures, the pressure would rise to about 0.001 Torr (0.133 Pa) due to out-gassing of the materials in the furnace. The residual gases were reducing relative to iron but oxidizing to reactive metals such as chromium in the stainless steel.

The temperature of the brazing assemblies was monitored by a thermocouple placed in a hole in one of the two centermost examples. The temperature was initially raised to 300° C. and held for 5 minutes to allow any trace organic materials to burn off. The temperature was then raised to about 760° C. in about 50 minutes and then the power was turned off. The central temperature of the examples continued to rise to about 770° C. The examples were allowed to cool overnight, for example 14 hours, in vacuum.

Two sets of four examples each were brazed in two separate brazing cycles in the vacuum furnace. Examples 1 through 4 were brazed in the first brazing cycle and 5 through 8 were brazed in the second brazing cycle. The reducing metal used to reduce the oxide of the chromium at the surface of the stainless steel was varied. The reducing metal used in each Example is shown in Table 1. The vapor coated examples were produced by vaporizing molten metals in a bell jar under high vacuum. The thickness of the deposited coating was determined using a piece of glass which was adjacent to the braze foils. The glass was fractured and the fractured surface was examined with an optical microscope at 1000× magnification to determine the thickness of the metal deposit.

Peel Testing Procedure

Two inch long segments were sawn from the end of the segments. They were about ⅜ inch (0.95 centimeters) wide. The end of the nickel shim was pried away from the stainless steel with a sharp chisel. A clamp was attached to the nickel and a hand held force gauge was used to measure the force needed to peel the rest of the nickel away from the stainless steel. The nickel was peeled away at 90 degrees from the stainless steel. The width of the segments was measured with a caliper and the 90 degree peel strength was computed by dividing the peel force in pounds by the segment width in inches. The resulting values were then converted to kilonewtons per meter (kN/m). The force gauge was set to record the maximum force applied. Short lengths of nickel foil were peeled away and several measurements were made on each segment in this manner.

Comparative Example A

A stacked preform was prepared by coating the surface of a six inch by six inch 340 stainless steel plate with a thin layer of non-metallic fluorine based flux, HANDYFLUX (commercially available from Lucas Milhaupt, Inc., Cudahy, Wis.), adding a layer of 0.13 millimeter BR 505 braze foil (commercially available from Lucas-Milhaupt, Inc., Cudahy, Wis.), and a nickel shim. The nickel shim had a diamond abrasive sintered on the opposite side. The preform was placed in a sintering press that was adapted for brazing. The sintering press heated examples between two plattens, under pressure of about 15 MPa, by running a large electrical current through the examples. Graphite paper between the metal parts and the plattens added resistance to the electrical circuit for effective heating. The examples were heated to 800° C. and cooled under pressure, about 115 MPa, in the sintering press. 7 millimeter wide examples by 38 millimeters long were cut out of the brazed plates.

Examples 1–8

Examples 1–8 were prepared as described in the Brazing Procedure set forth above. The reducing metal used for each example is described in Table 1.

TABLE 1

Reducing Metals for Examples 1–8

| Example Number | Reducing Metal |
| --- | --- |
| 1 | 0.3 microns of aluminum (99.9% pure Al pellets obtained from, Aldrich Chemical Co., Milwaukee, WI, catalog number 26652-3) vapor coated onto the braze foil. |
| 2 | 8 micron aluminum foil (Alufoil Products Co. Inc, Hauppauge, NY). |
| 3 | 16 micron aluminum foil (Reynolds Metals Company, Richmond, VA). |
| 4 | 111 micron aluminum foil (disposable aluminum pan stock). |
| 5 | 1.3 microns of aluminum and magnesium vapor coated on the foil. The initial composition of the metal source was approximately 30% aluminum foil and 70% magnesium ribbon. |
| 6 | Aluminum powder. 0.10 gram (Fisher Scientific Co., Fair Lawn, NJ). The amount dusted on was equivalent to a 5 micron aluminum foil. |
| 7 | 8 micron aluminum foil, a duplicate of example 2 but brazed in the second brazing cycle. |
| 8 | 0.14 grams magnesium powder (Reade Manufacturing Company, Lakehurst NJ). The amount dusted on was the molar equivalent of an 8 micron aluminum foil. |

Peel strength for Comparative Example A and Examples 1–8 was measured according to the Peel Testing Procedure set forth above. Average values are reported in Table 2.

TABLE 2

Peel Strength Data for Example 1–8 and C. Ex. A

| Sample | Number of Tests | Average Peel (kN/m) | Standard Deviation (kN/m) |
|---|---|---|---|
| C. Ex. A | N/A | 7.4 | N/A |
| Ex. 1 | 12 | 5.2 | ±1.9 |
| Ex. 2 | 15 | 18.9 | ±1.1 |
| Ex. 3 | 17 | 16.3 | ±0.8 |
| Ex. 4 | 17 | 14.2 | ±1.1 |
| Ex. 5 | 10 | 7.4 | ±0.9 |
| Ex. 6 | 15 | 12.8 | ±1.8 |
| Ex. 7 | 13 | 16.6 | ±1.7 |
| Ex. 8 | 16 | 9.5 | ±1.0 |

The data exhibits that an adequate amount of reducing metal flux creates a stronger stainless steel bond than the fluorine based flux presently available. The thin aluminum foil, depicted in Examples 2 and 7, appears to be an optimal flux for the Examples. Additionally, the foil as a flux created a slightly stronger bond than the powder or vapor coating.

Comparative Examples B–C and Example 9

Comparative Examples B and C were prepared as described in the Brazing Procedure set forth above. However, the stainless steel plates were first electro-plated with 20 microns of nickel by Co-operative Plating, St. Paul, Minn. The electroplated stainless steel was stacked with a braze material and a nickel shim as before prior to brazing in the vacuum furnace. Comparative Examples B and C were brazed with 127 micrometer thick BR 604 and 127 micrometer thick BR 616 respectively (commercially available from Lucas Milhaupt, Inc., Cudahy, Wis.).

Example 9 was prepared as described in the Brazing Procedure set forth above, with a reducing metal of a 16 micrometer aluminum foil (commercially available from Reynolds Metals Co., Richmond, Va.) between the stainless steel and the braze foil.

Ninety degree peel strengths were measured according to the peel strength procedure described above. The results are reported in Table 3.

TABLE 3

| Example | Braze Composition | Peel (kN/m) |
|---|---|---|
| C. Ex. B | BR 604 | 13.3 |
| C. Ex. C | BR 616 | 14.0 |
| 9 | BR 604, with Aluminum | 14.7 |

Therefore, the non-nickel coated stainless steel with the aluminum flux created a strong brazed bind, even stronger then the known method of using nickel electro-plated stainless steel as evidenced by the direct comparison of Comparative Example B with Example 9.

Corrosion Resistance Testing

Example 3 was brazed in the vacuum furnace with an aluminum layer and was tested for corrosion. Additionally, an example prepared as in Comparative Example A was tested for corrosion. Both pieces were placed in a petri dish, covered with cheesecloth and moistened with de-ionized water. A drop of ammonium hydroxide was added to give the water some conductivity. The example was allowed to dry slowly over a period of about 2 days at about 20° C.

Figure 5:
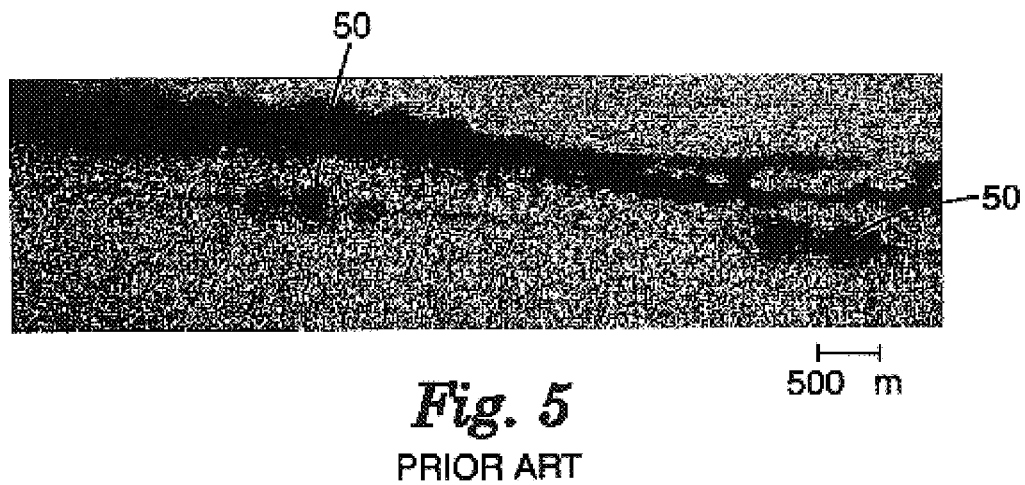
FIG. 5 is an optical image of a standard brazed body formed using a commercially available flux.
Figure 6:
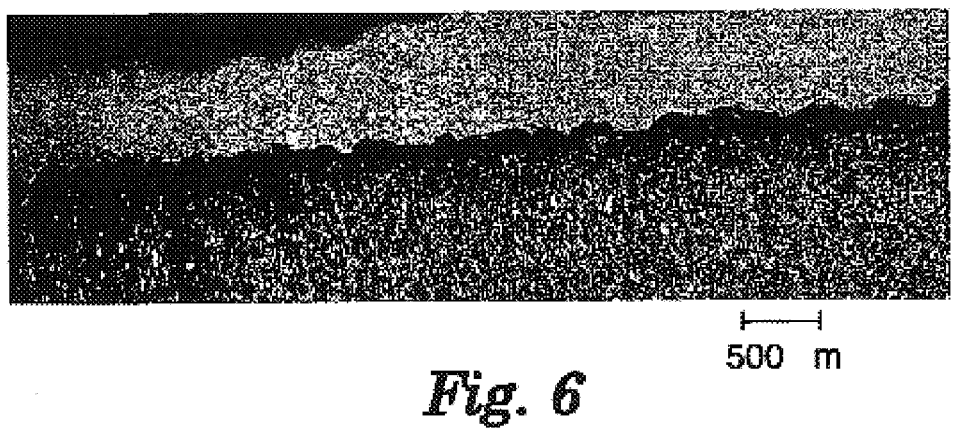
FIG. 6 is an optical image of a brazed body according to an embodiment of the present invention, with aluminum as a flux.

The resulting brazed bodies can be seen in the optical images attached as FIGS. 5 and 6. Rust spots 50 formed along the braze interface of the example made with flux in FIG. 5, while no rust spots formed along the braze interface of the inventive example vacuum brazed with aluminum shown in FIG. 6.

It is to be understood that the above description is intended to be illustrative and not restrictive. Various modifications and alterations of the invention will become apparent to those skilled in the art from the foregoing description without departing from the scope and the spirit of the invention. It should be understood that this invention is not to be unduly limited to the illustrated embodiments set forth herein.

What is claimed is:

1. An abrasive article comprising (a) a first layer comprising a material having a melting temperature higher than 660° C.;

(b) a second layer comprising a fused abrasive body; and (c) a filler layer between the first layer and the second layers, the filler layer comprising a multi-phase alloy comprised of a braze and a reducing metal oxide.

2. The abrasive article of claim 1 wherein the fused abrasive body has a melting temperature higher than 660° C.

3. The abrasive article of claim 1 wherein the first layer material is a metal.

4. The abrasive article of claim 3 wherein the metal is stainless steel.

* * * * *

UNITED STATES PATENT AND TRADEMARK OFFICE
CERTIFICATE OF CORRECTION

PATENT NO. : 6,858,050 B2 Page 1 of 1
APPLICATION NO. : 10/413682
DATED : February 22, 2005
INVENTOR(S) : Palmgren, Gary M.

It is certified that error appears in the above-identified patent and that said Letters Patent is hereby corrected as shown below:

Title Page (page 1)
(56) under OTHER PUBLICATIONS
Line 1, before "Filler" insert --Brochure,--

Title Page (page 2)
(56) under OTHER PUBLICATIONS
Line 1, delete "*Mettallurgical*" and insert --*Metallurgical*--
Line 15, delete "*Enigeering*" and insert --*Engineering*--

Column 12
Line 41, delete "layers" and insert --layer--

Signed and Sealed this

First Day of August, 2006

JON W. DUDAS
*Director of the United States Patent and Trademark Office*